F. C. POLING.
MUD LUG.
APPLICATION FILED APR. 28, 1917.
1,236,602.
Patented Aug. 14, 1917.
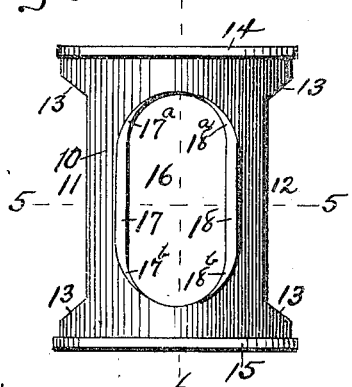
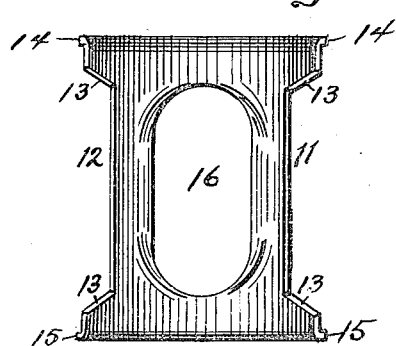
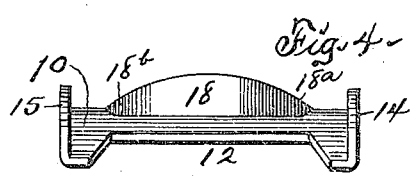
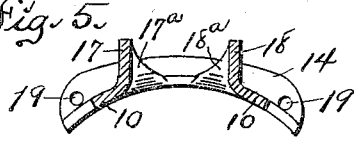
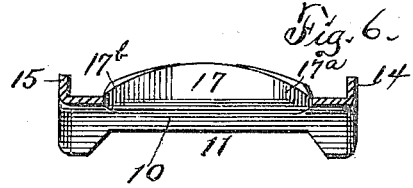
Inventor:
Fred C. Poling.
By Silas Sweet
Atty

UNITED STATES PATENT OFFICE.

FRED C. POLING, OF MENLO, IOWA, ASSIGNOR TO GOODE ANTI-SKID CHAIN MANUFACTURING COMPANY, OF DES MOINES, IOWA, A CORPORATION OF ARIZONA.

MUD-LUG.

1,236,602.  Specification of Letters Patent.  Patented Aug. 14, 1917.

Application filed April 28, 1917. Serial No. 165,170.

*To all whom it may concern:*

Be it known that I, FRED C. POLING, a citizen of the United States of America, and resident of Menlo, in the county of Guthrie and State of Iowa, have invented a new and useful Mud-Lug, of which the following is a specification.

The object of this invention is to provide improved construction for a mud lug adapted to be attached to a wheel tire and, when so attached, adapted to increase the traction of said wheel tire and at the same time prevent skidding thereof.

A further object of this invention is to provide an improved construction for a mud lug having the maximum degree of strength and efficiency in use combined with economy of manufacture and convenience of application and removal.

A further object of this invention is to provide a construction whereby a mud lug, when employed on a rubber or composition tire, will not cut into and damage said tire in use.

My invention consists in the construction, arrangement and coöperation of structural elements, including shape, form and configuration, of an article of manufacture preferably made in one piece of metal by stamping, as hereinafter set forth, pointed out in my claims and illustrated by the accompanying drawing, in which—

Figure 1 is a plan or face view of the complete lug. Fig. 2 is a bottom plan, or inner face view, of the same lug. Fig. 3 is an end elevation of the lug. Fig. 4 is a side elevation of the lug. Fig. 5 is a cross-section of the lug on the indicated line 5—5 of Fig. 1. Fig. 6 is a longitudinal section of the lug on the indicated line 6—6 of Fig. 1.

This device preferably is made of a single piece of metal by stamping, drawing or drop-forging and it may be cold-drawn or stamped or be heat-treated as desired.

The lug is formed with base, or plate, or frame, 10 of generally rectangular form with elongated notches 11, 12 in its longer side margins, said notches having oblique end walls 13. The base also is formed arcuate in cross-section and straight in trend. The base 10 also is formed with end flanges 14, 15 projecting from and at right angles to the convex face of the base, and said end flanges also are curved in conformity with the base, save and except that the outer margins of said flanges are on curved lines eccentric to the curvature of the base, the arc of curvature of said margins having a greater radius than the arc of curvature of the base, and, further, the ends of said flanges are rounded. An oblong hole 16 is formed in the base 10; the sides of said hole being straight and parallel with each other and the ends of said hole being rounded. In forming the hole 16, portions of the metal of the base 10 are struck up and extended at right angles from the convex face of the base to form flanges 17, 18 (hereinafter referred to as longitudinal flanges). The central or body portions of the longitudinal flanges 17, 18 are straight and parallel with each other and form walls at the long sides of the hole 16, and end portions 17$^a$, 17$^b$ and 18$^a$, 18$^b$ of said longitudinal flanges are curved toward (but not to) the median line of the lug and taper to the extremities of said flanges. This inward curving of end portions of the flanges (toward the median line of the lug) braces the central or body portions of the flanges to the base and prevents displacement, flattening, bending or breaking down of said flanges in use. The outer margins of the longitudinal flanges 17, 18 are on lines of curvature, being arcs of a circle the chord of which is formed by the straight longitudinal line of the base at the angle between the outer face of either flange and either side of said base, which line, in either instance is parallel with and slightly below the median line of the lug or apex line thereof. On the inner face of the lug, the metal is rounded at the bases of the flanges, both the end-flanges 14, 15 and the longitudinal flanges 17, 18, thus providing against cutting into a rubber or composition tire when the lug is used on such tire. Holes 19 are formed in the end portions of the end flanges 14, 15 and said holes are adapted to receive fastening means, such as stay-chains (not shown) whereby the lug may be connected at its four corners to a wheel rim or tire.

When this lug is to be employed on a non-pneumatic tire it is made straight transversely except for the flanges as described, thus omitting the arcuate formation of the base 10.

The flanges 17, 18 extend at their centers to greater distances from the base 10 than do the central portions of the end-flanges 14, 15.

It is the function of all the flanges, as well as the base itself to increase the traction of the wheel tire and it is the special function of the longitudinal flanges 17, 18 to prevent skidding of said tire, which functions are utilized to the greatest degree in traveling over muddy or slippery surfaces.

I claim as my invention—

1. As an improved article of manufacture, a mud-lug comprising a base formed with an oblong hole in its central portion, said base being formed with transverse end-flanges and also being formed with longitudinal flanges at the longer side margins of said hole, said hole being formed with rounded ends, end portions of said longitudinal flanges being extended toward the median line of the base partially around the ends of said hole and tapering into said base.

2. As an improved article of manufacture, a mud-lug comprising a base formed with an oblong hole having rounded ends and side margins partially parallel with each other, said base being formed with longitudinal flanges bordering but not inclosing said hole, end portions of said longitudinal flanges being extended toward the median line of said base along the rounded corners of said hole whereby said longitudinal flanges are braced to said base, said base also being formed with transverse end flanges extending across the longitudinal planes of the longitudinal flanges and spaced therefrom, said end flanges being formed with holes adapted to receive fastening means.

3. As an improved article of manufacture, a mud-lug comprising an arcuate base formed with an oblong hole having rounded ends and side margins partially parallel, said base being formed with longitudinal side flanges bordering said hole, end portions of said longitudinal flanges being extended toward the median line of said base along the rounded corners of said hole whereby said longitudinal flanges are braced to said base, and means for fastening said base to a tire.

4. As an improved article of manufacture, a mud-lug comprising an arcuate base formed with an oblong hole having rounded ends and partially parallel side margins, said base being formed with longitudinal flanges bordering said hole, end portions of said longitudinal flanges being extended toward the median line of the base along the rounded corners of said hole whereby said longitudinal flanges are braced to said base, said base being also formed with end-flanges extending across the longitudinal flanges, planes of the longitudinal flanges, said flanges projecting from the convex face of the base, and having their outer margins on curved lines, the outer margins of the longitudinal flanges arching from the base, the outer margins of the end-flanges being on line of curvature having a greater radius than the base, the inner surface of the base being rounded adjacent to the bases of said flanges, and the end-flanges being formed with holes in their end portions adapted to receive fastening means.

5. As an improved article of maufacture, a mud-lug comprising an arcuate oblong base formed with oblong notches in and crossing the centers of its longer side margins and also formed with an oblong hole having rounded ends and partially parallel margins, said base being formed with longitudinal flanges bordering said hole, end portions of said longitudinal flanges being extended toward the median line of and tapering into the base along the rounded corners of said hole whereby said longitudinal flanges are braced to said base, said base also being formed with end flanges extending across the longitudinal planes of the longitudinal flanges, said flanges projecting from the convex face of the base, and the end-flanges having holes in their end portions adapted to receive fastening means.

FRED C. POLING.